US009102063B2

United States Patent
Ito et al.

(10) Patent No.: US 9,102,063 B2
(45) Date of Patent: Aug. 11, 2015

(54) ROBOT APPARATUS

(71) Applicant: KABUSHIKI KAISHA YASKAWA DENKI, Kitakyushu-shi (JP)

(72) Inventors: Toshiki Ito, Kitakyushu (JP); Yuya Yasuda, Kitakyushu (JP); Shinji Murai, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 134 days.

(21) Appl. No.: 13/956,361

(22) Filed: Aug. 1, 2013

(65) Prior Publication Data
US 2014/0081452 A1  Mar. 20, 2014

(30) Foreign Application Priority Data

Sep. 14, 2012 (JP) .................................. 2012-202920

(51) Int. Cl.
*G06F 19/00* (2011.01)
*B25J 9/16* (2006.01)

(52) U.S. Cl.
CPC .............. *B25J 9/1669* (2013.01); *B25J 9/1679* (2013.01)

(58) Field of Classification Search
CPC .... B25J 19/023; B25J 19/0093; B25J 9/1697; G05B 19/4182; G05B 2219/40005; G06T 7/004
USPC ............ 700/245, 258, 259; 901/1, 7, 8, 9, 31, 901/40, 46, 47
See application file for complete search history.

(56) References Cited

U.S. PATENT DOCUMENTS

| 4,437,114 | A | * | 3/1984 | LaRussa | .......................... | 348/94 |
| 5,040,056 | A | * | 8/1991 | Sager et al. | ...................... | 348/88 |
| 5,041,907 | A | * | 8/1991 | Sager et al. | ...................... | 348/91 |
| 2005/0075752 | A1 | * | 4/2005 | Ban et al. | ....................... | 700/213 |
| 2007/0007924 | A1 | * | 1/2007 | Nishihara et al. | ............. | 318/560 |
| 2010/0121489 | A1 | * | 5/2010 | Inazumi et al. | ............... | 700/255 |
| 2011/0098859 | A1 | * | 4/2011 | Irie et al. | ....................... | 700/259 |

(Continued)

FOREIGN PATENT DOCUMENTS

| JP | 2001-300878 | 10/2001 | | |
| JP | 2002-113678 | 4/2002 | | |
| JP | 2002113678 A | * 4/2002 | ............... B25J 13/00 |

OTHER PUBLICATIONS

Japanese Office Action for corresponding JP Application No. 2012-202920, Dec. 26, 2013.

*Primary Examiner* — Khoi Tran
*Assistant Examiner* — Jorge Peche
(74) *Attorney, Agent, or Firm* — Mori & Ward, LLP

(57) ABSTRACT

A robot apparatus includes a robot main body, a distance determining section, an order determining section, and an operation controlling section. The robot main body transfers a plurality of to-be-processed objects in order so as to subject every predetermined number of the to-be-processed objects to processing, and includes a robot arm and a robot hand. The distance determining section determines an entire transfer distance of each of the to-be-processed objects. The order determining section determines a transfer order of the to-be-processed objects based on a determination result of the distance determining section so that every predetermined number of the to-be-processed objects has uniform transfer time. The operation controlling section controls operations of the robot arm and the robot hand so as to transfer the to-be-processed objects in accordance with the transfer order determined by the order determining section.

20 Claims, 12 Drawing Sheets

(56) References Cited

U.S. PATENT DOCUMENTS

| | | | |
|---|---|---|---|
| 2011/0222995 A1* | 9/2011 | Irie et al. | 414/225.01 |
| 2011/0280691 A1* | 11/2011 | Yabe | 414/222.01 |
| 2011/0301744 A1* | 12/2011 | Ichimaru | 700/214 |

* cited by examiner

FIG. 5
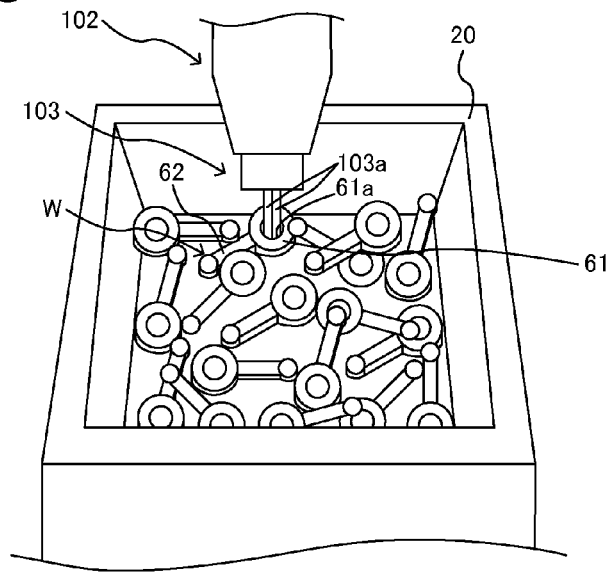
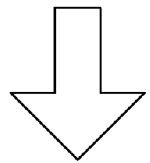
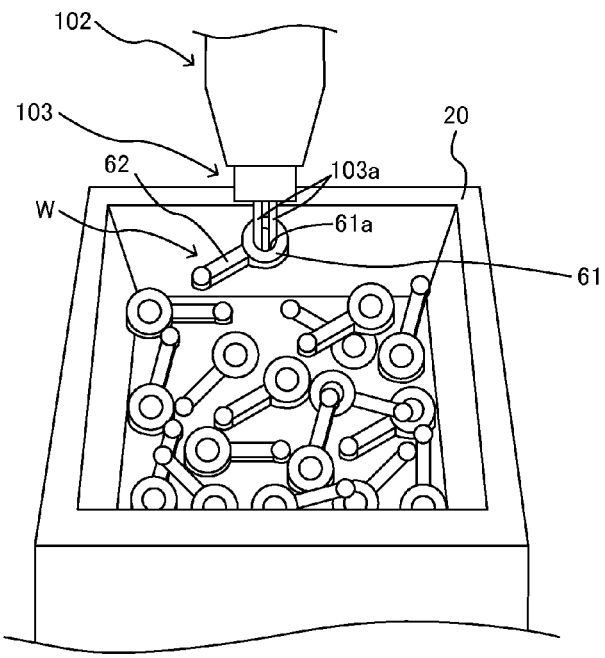

ROBOT APPARATUS

CROSS-REFERENCE TO RELATED APPLICATIONS

The present application claims priority under 35 U.S.C. §119 to Japanese Patent Application No. 2012-202920, filed Sep. 14, 2012. The contents of this application are incorporated herein by reference in their entirety.

BACKGROUND OF THE INVENTION

1. Field of the Invention

The present invention relates to a robot apparatus.

2. Discussion of the Background

Japanese Unexamined Patent Application Publication No. 2001-300878 discloses a robot main body disposed in a robot apparatus. The robot main body (multi-articular robot) includes a robot arm (arm) and a robot hand (magnet hand) mounted to a distal end of the robot arm. In the vicinity of the robot main body, a pallet is placed on which a plurality of to-be-processed objects (iron workpieces) are randomly stacked. Then, the robot main body makes the robot hand suck one to-be-processed object after another out of the pallet.

SUMMARY OF THE INVENTION

According to one aspect of the present invention, a robot apparatus includes a robot main body, a distance determining section, an order determining section, and an operation controlling section. The robot main body is configured to transfer a plurality of to-be-processed objects in order so as to subject every predetermined number of to-be-processed objects among the plurality of to-be-processed objects to processing, and includes a robot arm and a robot hand. The robot hand is configured to hold a to-be-processed object among the plurality of to-be-processed objects by at least one of gripping and suction. The distance determining section is configured to determine an entire transfer distance of each of the plurality of to-be-processed objects. The entire transfer distance is from a location of each of the plurality of to-be-processed objects to a transfer destination of each of the plurality of to-be-processed objects. The order determining section is configured to determine a transfer order of the plurality of to-be-processed objects based on a determination result of the distance determining section so that every predetermined number of the to-be-processed objects has uniform transfer time. The operation controlling section is configured to control an operation of the robot arm and an operation of the robot hand so as to transfer the plurality of to-be-processed objects in accordance with the transfer order determined by the order determining section.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 illustrates a form of the operation of gripping a workpiece;

DESCRIPTION OF THE EMBODIMENTS

Figure 1:
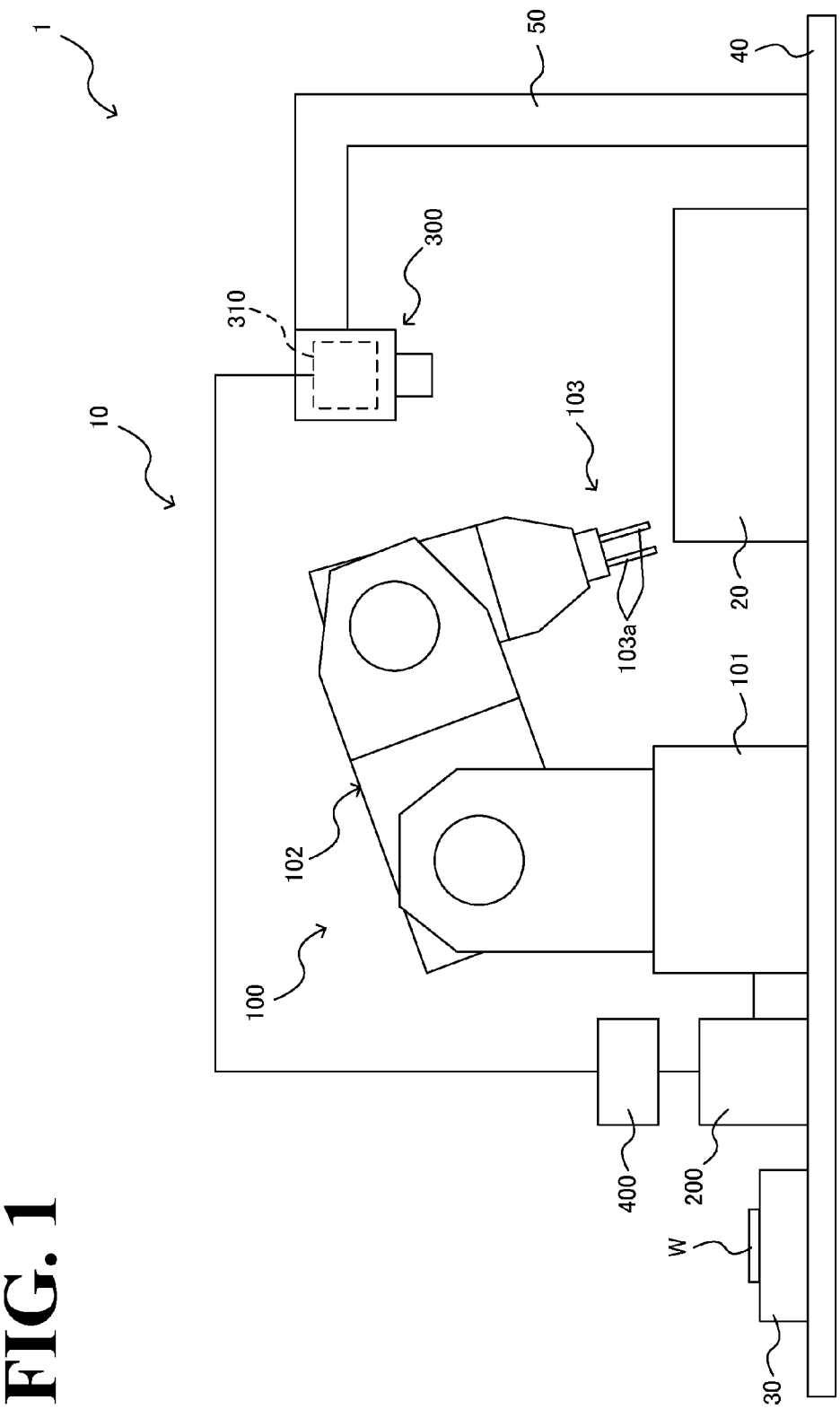
FIG. 1 is a side view of a robot system according to one embodiment, illustrating a schematic general arrangement of the robot system.

The embodiments will now be described with reference to the accompanying drawings, wherein like reference numerals designate corresponding or identical elements throughout the various drawings.

First, by referring to FIGS. 1 to 2, a general arrangement of a robot system according to this embodiment will be described.

Figure 2:
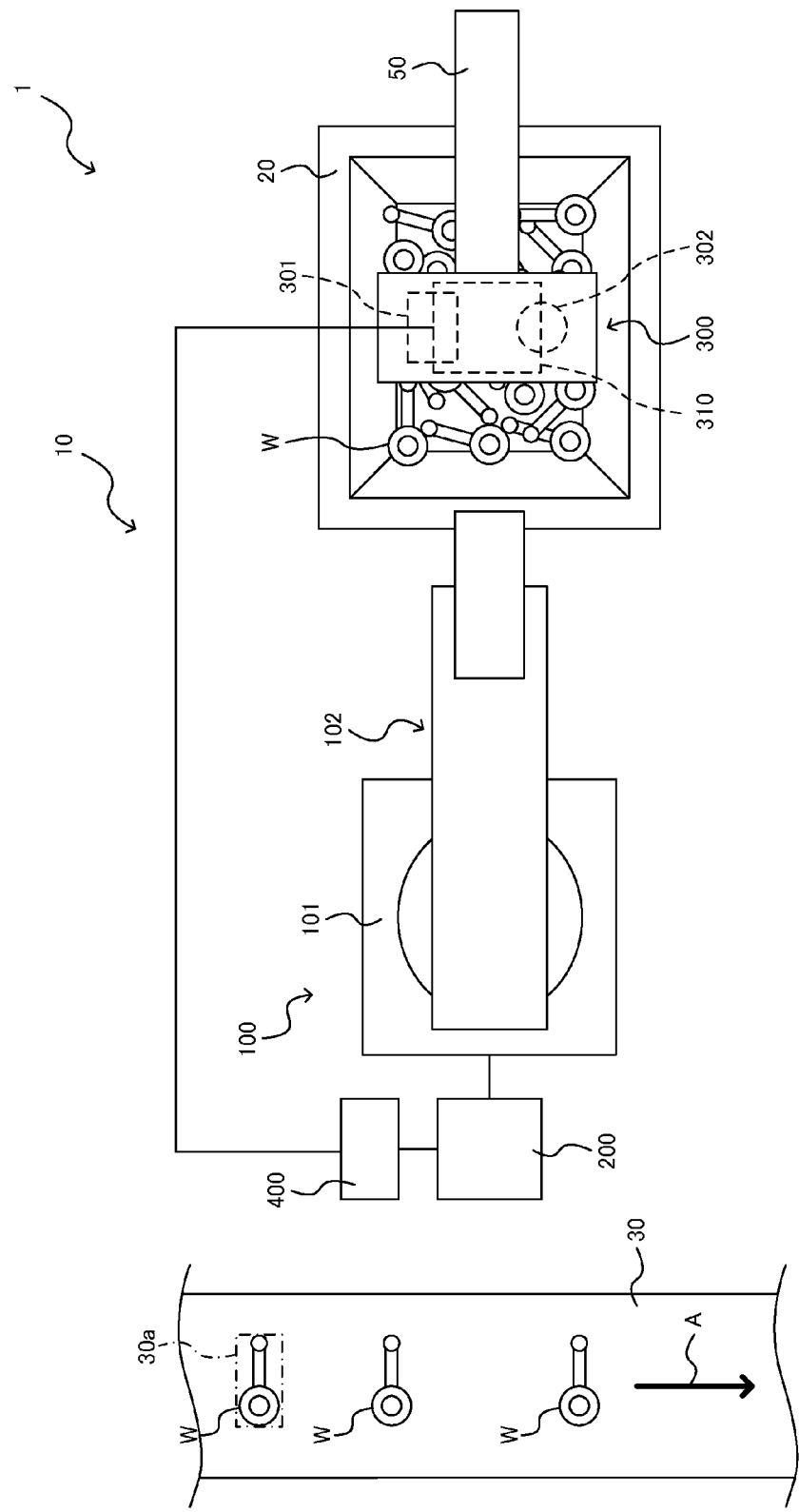
FIG. 2 is a top view of the robot system, illustrating a schematic general arrangement of the robot system.
Figure 3:
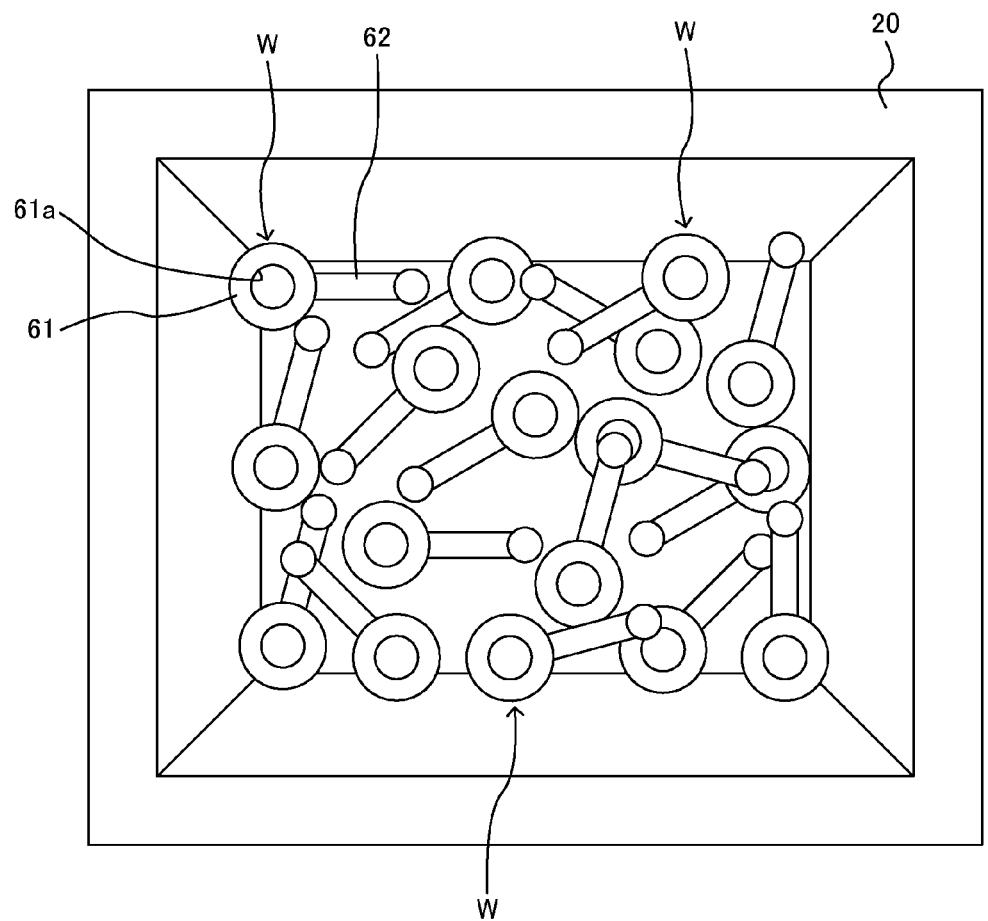
FIG. 3 is a top view of a stocker, illustrating an inside of the stocker.

As shown in FIGS. 1 to 3, a robot system 1 according to this embodiment includes a stocker 20, a robot apparatus 10, and a conveyor 30.

The stocker 20 is a box formed of, for example, reinforced resin, metal, or other material, and is disposed on a floor 40 in the vicinity (in the operable range) of a robot main body 100, described later, of the robot apparatus 10. The stocker 20 may not necessarily be disposed on the floor 40, but may be disposed on a pedestal or a like support disposed on the floor 40. Inside the stocker 20, a plurality of workpieces W (to-be-processed objects) are in stock in a random (scattered) manner. Each workpiece W has a head 61 and an arm 62. The head 61 has a through hole 61a. The arm 62 has a bar shape extending from the head 61. The workpiece W will not be limited to this shape, but may have any other shape.

The robot apparatus 10 includes the robot main body 100, a robot controller 200, a sensor unit 300, and an image processing apparatus 400. The robot main body 100 and the robot controller 200 are communicatively coupled to one another through a wire or wirelessly. The robot controller may be disposed inside the robot main body 100. The robot controller 200 and the image processing apparatus 400 are communicatively coupled to one another through a wire or wirelessly. Further, a sensor controller 310, described later, of the sensor unit 300 and the image processing apparatus 400 are communicatively coupled to one another through a wire or wirelessly. The image processing apparatus may be disposed inside the sensor unit 300.

The robot main body 100 is what is called a multi-articular robot, and includes a base 101 and an arm 102 (robot arm).

The base 101 is secured to the floor 40. The arm 102 is rotatably disposed on the base 101. The base 101 may not necessarily be secured to the floor 40, but may be secured to a pedestal or a like support disposed on the floor 40.

The arm 102 has a plurality of joints (rotary joints) from the end of the arm 102 on the base 101 side to the opposite, distal end of the arm 102. The arm 102 has a plurality of built-in servo motors (not shown) to drive the plurality of joints. At the distal end of the arm 102, a hand 103 (robot hand) is disposed capable of holding a workpiece W by gripping or suction. The hand may be disposed at a portion of the arm 102 other than its distal end.

There is no particular limitation to the hand 103 insofar as the hand 103 is capable of holding the workpiece W by gripping or suction. Examples include, but not limited to, a gripper with fingers capable of gripping the workpiece W, and a suction device driven pneumatically, electromagnetically, or by some other force to suck the workpiece W. In this embodiment, the above-described gripper is employed as the hand 103, and hence, the hand device 103 will be also referred to as a gripper 103.

The gripper 103 includes a pair of fingers 103a capable of gripping the workpiece W. The pair of fingers 103a are driven by a suitable actuator (not shown) built in the gripper 103 to make an open-close operation of expanding or diminishing the spacing between the pair of fingers 103a. The gripper 103 will not be limited to this structure, and other examples include, but not limited to, a gripper with a plurality of fingers that make a swinging movement to grip the workpiece W.

The robot main body 100 performs transfer work (what is called Random Bin Picking) of the plurality of workpieces W disposed in the stocker 20. Specifically, the robot main body 100 grips the plurality of workpieces W disposed in the stocker 20 in order on a one-by-one basis using the fingers 103a of the gripper 103, and places the workpieces W on their transfer destination on the conveyor 30, namely, a predetermined workpiece placement position 30a, described later. The transfer destination of the workpieces W will not be limited to the workpiece placement position 30a on the conveyor 30, but may be elsewhere (examples include a part of the equipment associated with a post-processing step, described later). The transfer work by the robot main body 100 will be described in more detail later.

The robot controller 200 is made up of a computer that includes, for example, an operator, a memory, and an input device. The robot controller 200 controls the operations of the robot main body 100 as a whole, which includes the arm 102 and the gripper 103 (for example, controls driving of the joints of the arm 102, and the open-close operation of the fingers 103a of the gripper 103). The robot controller 200 will be described in more detail later.

The sensor unit 300 includes a laser scanner 301 and a camera 302. The sensor unit 300 is positioned over the stocker 20 while being supported by a suitable support 50 with the laser scanner 301 and the camera 302 facing downward. The support 50 is secured to the floor 40. The sensor unit 300 may be disposed at a suitable portion of the robot main body 100 (for example, the distal end of the arm 102).

The laser scanner 301 includes a laser light source that generates slit-shaped laser light (hereinafter referred to as laser slit light), a mirror that reflects laser slit light, and a motor that rotates the mirror (all of which are not shown). The laser scanner 301 has its mirror reflect the laser slit light generated by the laser light source and has the motor rotate the mirror, thereby radiating, from above, the laser slit light to the entire region in which the workpieces W in the stocker 20 are possibly disposed (that is, the region in which all the workpieces W are disposed, which will be hereinafter also referred to as an inner-stocker 20 entire region). Thus, the laser scanner 301 collectively scans the workpieces W located in the inner-stocker 20 entire region.

The camera 302 includes an image pick-up device (not shown) and other elements. When the laser slit light is generated by the laser light source and reflected by the mirror as described above, the reflected objects (for example, the workpieces W and the stocker 20 itself) located in the inner-stocker 20 entire region reflect the laser slit light, which results in reflection light of the laser slit light. The camera 302 has its image pick-up device pick up an image of (receive) the reflection light of the laser slit light. That is, the camera 302 has its image pick-up device pick up an image (grayscale image) from above the inner-stocker 20 entire region, and an image of the reflection light of the laser slit light reflected by the reflected objects located in the inner-stocker 20 entire region.

Inside the sensor unit 300, the sensor controller 310 is built in. The sensor controller 310 is made up of a computer that includes, for example, an operator and a memory, and controls the operations of the sensor unit 300 as a whole, which includes the laser scanner 301 and the camera 302. The sensor controller 310 detects the distance to the reflected objects located in the inner-stocker 20 entire region using a known principle of triangulation based on the rotational angle of the motor (mirror), the position of the image pick-up device of the camera 302 at the time when the image pick-up device received light, and a positional relationship among the laser light source, the mirror, and the camera 302. Then, the sensor controller 310 outputs to the image processing apparatus 400 a detection signal as a detection result of the sensor unit 300. The detection signal includes the image picked up from above the inner-stocker 20 entire region, and distance information that is indicated on this image and that corresponds to the detected distance to the reflected objects located in the inner-stocker 20 entire region.

The image processing apparatus 400 is made up of a computer that includes, for example, an operator and a memory. Based on the detection signal from the sensor controller 310 and other information, the image processing apparatus 400 individually recognizes (measures three-dimensionally) the workpieces W located in the inner-stocker 20 entire region that has been scanned by the sensor unit 300. The image processing apparatus 400 will be described in more detail later.

The conveyor 30 has the workpiece placement position 30a disposed in the operable range of the robot main body 100. In a predetermined transfer direction (the direction indicated by the arrow A in FIG. 2), the conveyor 30 conveys the workpieces W that have been transferred by the robot main body 100 in the manner described above. On the downstream side of the conveyor 30 in the transfer direction, predetermined equipment (not shown) associated with a post-processing step is disposed. The post-processing step is a processing step next to be performed with respect to the transferred workpieces W. That is, the conveyor 30 forwards the transferred workpieces W to the equipment associated with the post-processing step.

In the post-processing step, a predetermined number of the workpieces W conveyed by the conveyor 30 are subjected to processing (for example, treatment and assembly processing). Specifically, in the post-processing step, a predetermined number of the workpieces W conveyed by the conveyor 30 are grouped into one set, and the post-processing is performed on a one-set basis. In the post-processing step, there is no particular limitation to the number of workpieces W to be processed at a time. In this embodiment, the number of the workpieces W is illustrated as four. In the post-processing step, four workpieces W conveyed by the conveyor 30 are grouped into one set, and the post-processing is performed on a one-set basis.

Next, by referring to FIGS. 4 to 8, functional configurations of the image processing apparatus 400 and the robot controller 200 will be described.

Figure 4:
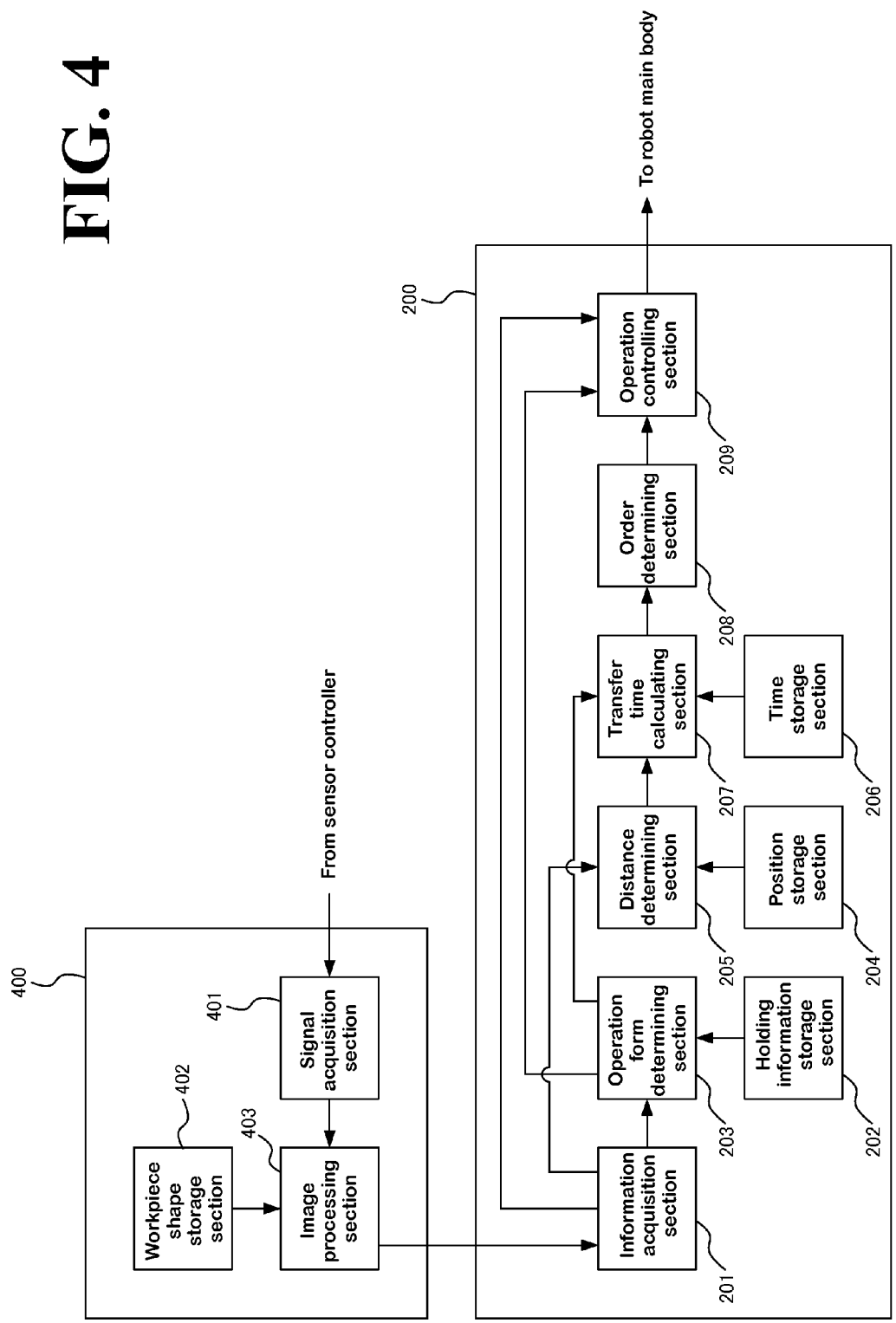
FIG. 4 is a function block diagram illustrating a functional configuration of an image processing apparatus and a robot controller.

As shown in FIG. 4, the image processing apparatus 400 includes a signal acquisition section 401, a workpiece shape storage section 402, and an image processing section 403.

The signal acquisition section 401 acquires the detection signal output from the sensor controller 310 of the sensor unit 300.

The workpiece shape storage section 402 stores three-dimensional shape information of the workpieces W acquired by measurement or other method performed in advance.

The image processing section 403 performs known, suitable image processing (for example, feature extraction processing and pattern matching processing) based on the three-dimensional shape information of the workpieces W stored in the workpiece shape storage section 402 and based on the detection signal acquired by the signal acquisition section 401. In this manner, the image processing section 403 individually recognizes the workpieces W located in the inner-stocker 20 entire region scanned by the sensor unit 300. At the same time, the image processing section 403 detects the locations and postures of each of the recognized workpieces W in the horizontal direction and the vertical direction (upward and downward directions). In the following description, the locations of each of the workpieces W in the horizontal direction and the vertical direction will be simply referred to as the location of each workpiece W. Then, the image processing section 403 outputs information indicating the detected location and posture of each workpiece W to the robot controller 200. The function of the image processing section 403 to detect the posture of each workpiece W corresponds to the posture determining section.

The robot controller 200 includes an information acquisition section 201, a holding information storage section 202, an operation form determining section 203, a position storage section 204, a distance determining section 205, a time storage section 206, a transfer time calculating section 207, an order determining section 208, and an operation controlling section 209.

The information acquisition section 201 acquires information indicating the location and posture of each workpiece W output from the image processing section 403 of the image processing apparatus 400.

The holding information storage section 202 stores information indicating holding operation forms of different kinds of workpieces W of mutually different transfer speeds, and stores, in relation to this information, execution conditions for the holding operation forms. The information indicating the holding operation forms of the workpieces W stored in the holding information storage section 202 may not necessarily include a plurality of kinds of forms. It is also possible to include only one kind of form.

As used herein, the holding operation form of a workpiece W specifies which position (portion) of the workpiece W to hold and which method (form) to use to hold the workpiece W. The holding operation forms are prioritized.

In this embodiment, the holding operation form of highest priority (for example, of highest transfer speed) is as shown in FIG. 5. The operation form specified here is that the fingers 103a of the gripper 103 in closed state are inserted through the through hole 61a of a workpiece W, and then the fingers 103a are turned into open state to grip the workpiece W. This holding operation form is specified under such execution conditions that the through hole 61a be detected, and that when the fingers 103a enter the through hole 61a, the gripper 103 including the fingers 103a and the robot main body 100 meet with no interference other than the workpiece W to be gripped.

Figure 6:
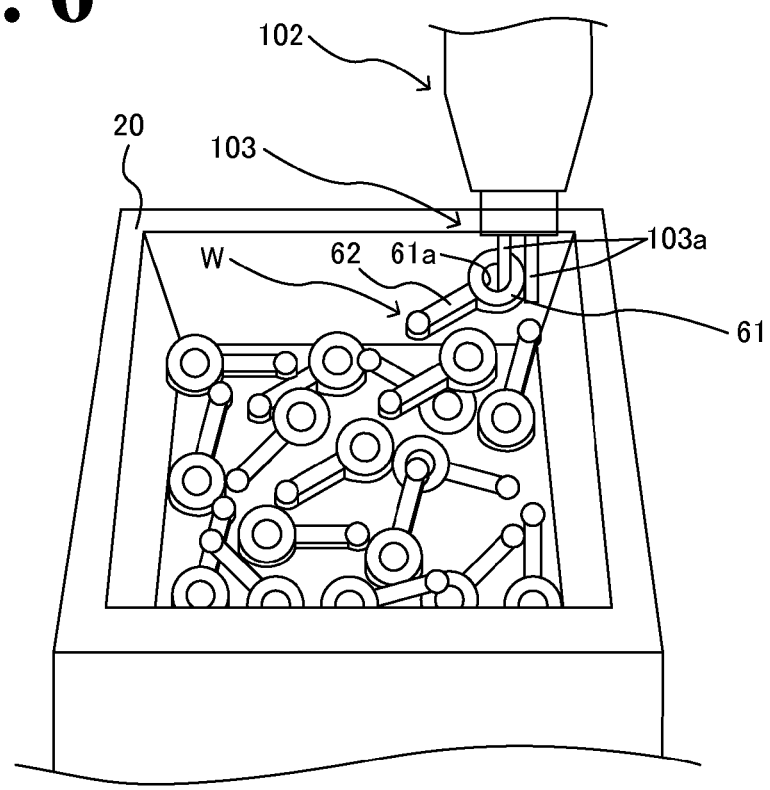
FIG. 6 illustrates a form of the operation of gripping a workpiece.

The holding operation form of second highest priority (for example, of second highest transfer speed) is as shown in FIG. 6. The operation form specified here is that the fingers 103a of the gripper 103 grip the head 61 of the workpiece W. This holding operation form is specified under such an execution condition that the posture of the grippable position of the head 61 cause no interference with the gripper 103 including the fingers 103a and the robot main body 100.

Figure 7:
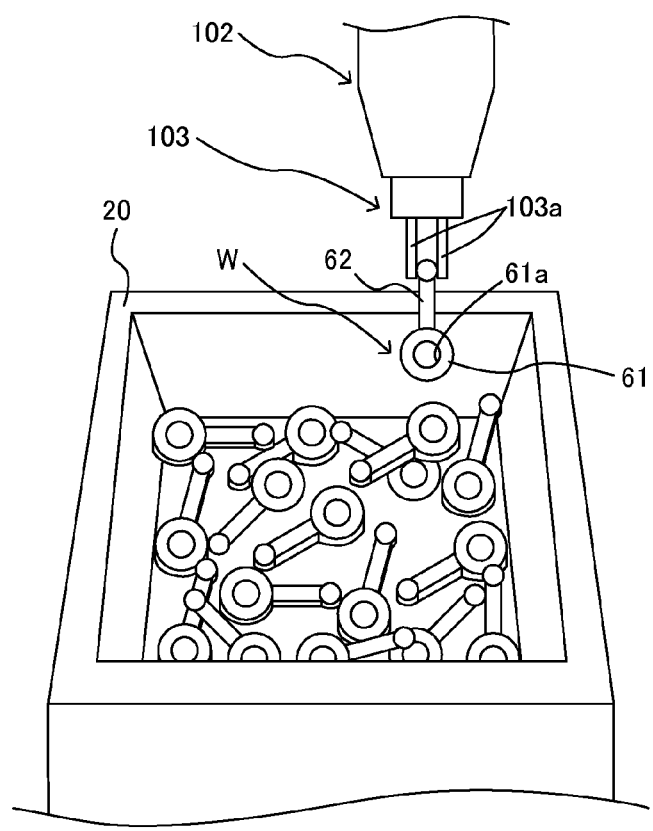
FIG. 7 illustrates a form of the operation of gripping a workpiece.

The holding operation form of third highest priority (for example, of third highest transfer speed) is as shown in FIG. 7. The operation form specified here is that the fingers 103a of the gripper 103 grip the arm 62 of the workpiece W. This holding operation form is specified under such an execution condition that the posture of the grippable position of the arm 62 cause no interference with the gripper 103 including the fingers 103a and the robot main body 100.

It should be noted that these holding operation forms and execution conditions are presented for exemplary purposes only; it is also possible to cancel or change at least one of the above-described holding operation forms and execution conditions, or to add some other holding operation form or execution condition to the above-described holding operation forms and execution conditions.

The operation form determining section 203 acquires information indicating the location and posture of each workpiece W acquired by the information acquisition section 201, and acquires information stored in the holding information storage section 202, namely, the holding operation forms of the plurality of kinds of workpieces W and the execution conditions for the holding operation forms. Then, based on these acquired pieces of information, the operation form determining section 203 determines whether any of the execution conditions for the holding operation forms are satisfied individually for each of the workpieces W. Then, when a workpiece W satisfies any of the execution conditions for the holding operation forms, the operation form determining section 203 determines a holding operation form individually for the workpiece W from among the holding operation forms associated with the satisfied execution condition. The determined holding operation form is a highest priority holding operation form among the holding operation forms. When no workpiece W satisfies any of the execution conditions for the holding operation forms, no determination is made as to the holding operation form.

The position storage section 204 stores position information of the workpiece placement position 30a on the conveyor 30.

The distance determining section 205 acquires, from among the information acquired by the information acquisition section 201, the information indicating the locations of the workpieces W, and the position information that indicates the workpiece placement position 30a on the conveyor 30 and that is stored in the position storage section 204. Then, based on these acquired pieces of information, the distance determining section 205 calculates an entire transfer distance individually for each of the workpieces W. The entire transfer distance is from the location of each workpiece W to the workpiece placement position 30a. That is, in this embodiment, the sensor unit 300 collectively scans the inner-stocker 20 entire region, and then the distance determining section 205 calculates the entire transfer distances of the workpieces W located in the inner-stocker 20 entire region at a time.

The time storage section 206 stores information indicating, for each of the holding operation forms, transfer time per predetermined unit transfer distance over which the workpiece W is transferred by the robot main body 100.

The transfer time calculating section 207 acquires: information indicating the entire transfer distances of the workpieces W calculated by the distance determining section 205; information indicating the holding operation forms of the workpieces W determined by the operation form determining section 203; and information stored in the time storage section 206 for each of the holding operation forms, namely, the transfer time per predetermined unit transfer distance over which the workpiece W is transferred. Then, based on these acquired pieces of information, the transfer time calculating section 207 calculates (estimates) the transfer time individually for each of the workpieces W transferred by the robot main body 100.

Based on the transfer time of each of the workpieces W calculated by the transfer time calculating section 207, the order determining section 208 determines the transfer order of the workpieces W. More specifically, the order determining section 208 determines the transfer order so that every one set of (four) workpieces W, which is collectively processed in the post-processing step, has approximately uniform transfer time. There is no particular limitation to the method by which the order determining section 208 determines the transfer order. Examples include the following methods.

Based on the transfer time of each of the workpieces W calculated by the transfer time calculating section 207, the order determining section 208 calculates average transfer time of one workpiece W. Then, based on the calculated average transfer time of one workpiece W, the order determining section 208 calculates average transfer time of one set (four workpieces W). Then, the order determining section 208 combines the workpieces W into sets (a first set, a second set, a third set, and so forth) of four workpieces W each so as to make the transfer time of each of the sets approximately equal to the above-calculated average transfer time of the one set, so that every set has approximately uniform transfer time. Then, the order determining section 208 determines the transfer order of the sets. In this case, each set is a mixture of a workpiece W with short transfer time and a workpiece W with long transfer time, or a mixture of workpieces W each with approximately average transfer time. Thus, the transfer time when viewed on a one-set basis is approximately uniform among the sets.

Figure 8:
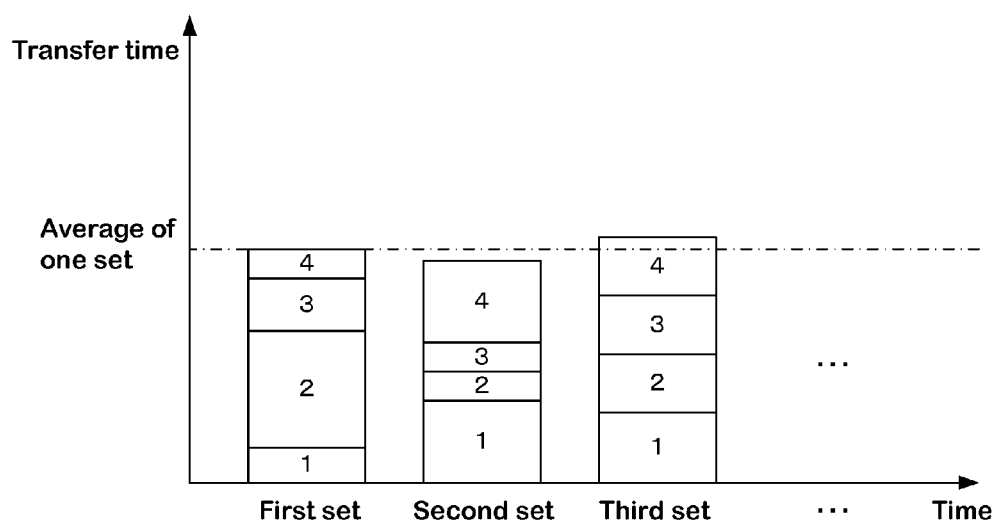
FIG. 8 illustrates an exemplary method of determining the transfer order by an order determining section.

FIG. 8 shows an example of the transfer order determined by the above-described method.

The example in FIG. 8 shows that in the first set, the first and fourth workpieces W have short transfer times, that the second workpiece W has long transfer time, and that the third workpiece W has approximately average transfer time. Such first set has transfer time approximately equal to the average transfer time of the one set. In the second set, the first (fifth in total) and fourth (eighth in total) workpieces W have long transfer times, and the second (sixth in total) and third (seventh in total) workpieces W have short transfer times. Such second set has transfer time that is slightly shorter than the transfer time of the first set; nevertheless, the transfer time is still approximately equal to the average transfer time of the one set. In the third set, the first to fourth (ninth to twelfth in total) workpieces W have approximately average transfer times. Such third set have transfer time that is slightly longer than the transfer time of the first set; nevertheless, the transfer time is still approximately equal to the average transfer time of the one set. The forth and later sets, which are not shown and not elaborated, each have transfer time approximately equal to the average transfer time of the one set, similarly to the first to third sets. Thus, the transfer time when viewed on a one-set basis is approximately uniform among the sets.

As shown in FIG. 4, the operation controlling section 209 acquires information indicating the location and posture of each workpiece W acquired by the information acquisition section 201, information indicating the holding operation form of each workpiece W determined by the operation form determining section 203, and information indicating the transfer order determined by the order determining section 208. Then, based on these acquired pieces of information, the operation controlling section 209 generates an operation signal for the servo motors of the arm 102 and the actuator of the gripper 103 so as to transfer each workpiece W in accordance with the transfer order determined by the order determining section 208 while gripping the workpiece W in the holding operation form determined by the operation form determining section 203. Then, the operation controlling section 209 outputs the generated operation signal to the servo motors of the arm 102 and to the actuator of the gripper 103, thereby controlling the operations of the arm 102 and the gripper 103 of the robot main body 100.

Next, by referring to FIG. 9, description will be made with regard to an exemplary procedure of control executed by the image processing apparatus 400 and the robot controller 200 according to this embodiment. Among the processings in the flow shown in FIG. 9, the processings at steps S10 and S20 are executed at the image processing apparatus 400, while the processings at steps S30 to S90 are executed at the robot controller 200.

Figure 9:
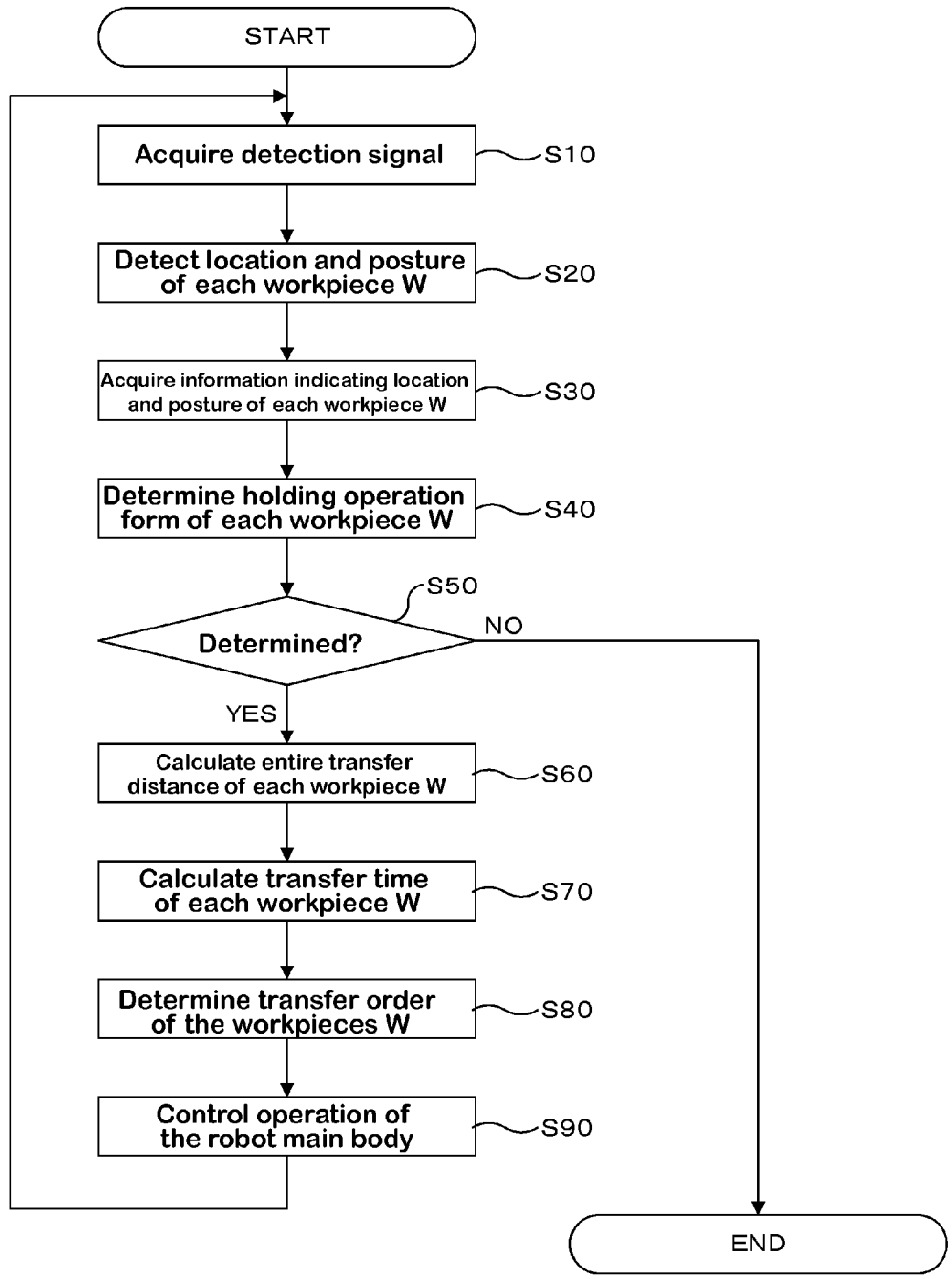
FIG. 9 is a flowchart of an exemplary procedure of control executed by the image processing apparatus and the robot controller.

As shown in FIG. 9, when the sensor unit 300 collectively scans the inner-stocker 20 entire region, and when the sensor controller 310 outputs a detection signal to the image processing apparatus 400, then at step S10, the image processing apparatus 400 has its signal acquisition section 401 acquire the detection signal.

Then, at step S20, the image processing apparatus 400 has its image processing section 403 individually recognize the workpieces W located in the inner-stocker 20 entire region scanned by the sensor unit 300 based on the three-dimensional shape information of the workpieces W stored in the workpiece shape storage section 402 and based on the detection signal acquired at step S10, while at the same time detecting the locations and postures of the recognized workpieces W. Then, the image processing apparatus 400 has its image processing section 403 output information indicating the detected location and posture of each workpiece W to the robot controller 200.

Then, at step S30, the robot controller 200 has its information acquisition section 201 acquire the information that indicates the location and posture of each workpiece W and that has been output from the image processing section 403 at step S20.

Then, at step S40, the robot controller 200 has its operation form determining section 203 acquire the information that indicates the location and posture of each workpiece W and that has been acquired at step S30, and acquire information stored in the holding information storage section 202, namely, the holding operation forms of the plurality of kinds of workpieces W and the execution conditions for the holding operation forms. Then, based on these acquired pieces of information, the robot controller 200 has its operation form determining section 203 determine whether any of the execution conditions for the holding operation forms are satisfied individually for each of the workpieces recognized at step S20. Then, when a workpiece W satisfies any of the execution conditions for the holding operation forms, the robot controller 200 has its operation form determining section 203 determine a holding operation form individually for the workpiece W from among the holding operation forms associated with the satisfied execution condition. The determined holding operation form is a highest priority holding operation form among the holding operation forms. When no workpiece W satisfies any of the execution conditions for the holding operation forms, no determination is made as to the holding operation form.

Then, at step S50, the robot controller 200 determines whether a holding operation form has been determined at step S40. When no holding operation form has been determined at step S40, that is, when no workpiece W satisfies any of the execution conditions for the holding operation forms, the determination at step S50 is not in the affirmative, and the processings illustrated on this flow end. It should be noted, however, that when there are still some workpieces W left, the robot main body 100 may perform a derangement operation with respect to these workpieces W as necessary, after which similar processings may be executed again back at step S10. The derangement operation, which is described in detail in, for example, Japanese Unexamined Patent Application Publication No. 2011-183537, will not be elaborated here. When a holding operation form has been determined at step S40, the determination at step S50 is in the affirmative, and the flow proceeds to step S60.

At step S60, the robot controller 200 has its distance determining section 205 acquire, from among the information acquired at step S30, the information indicating the locations of the workpieces W, and the position information that indicates the workpiece placement position 30a on the conveyor 30 and that is stored in the position storage section 204. Then, based on these acquired pieces of information, the robot controller 200 has its distance determining section 205 calculate an entire transfer distance individually for each of the workpieces W. The entire transfer distance is from the location of each workpiece W to the workpiece placement position 30a.

Then, at step S70, the robot controller 200 has its transfer time calculating section 207 acquire: information indicating the entire transfer distance of each workpiece W calculated at step S60; information indicating the holding operation form of each workpiece W determined at step S40; and information stored in the time storage section 206 for each of the holding operation forms, namely, the transfer time per predetermined unit transfer distance over which the workpiece W is transferred. Then, based on these acquired pieces of information, the robot controller 200 has its transfer time calculating section 207 calculate the transfer time individually for each of the workpieces W transferred by the robot main body 100.

Then, at step S80, the robot controller 200 has its order determining section 208 determine, based on the transfer time of each of the workpieces W calculated at step S70, the transfer order so that every one set of (four) workpieces W, which is collectively processed in the post-processing step, has approximately uniform transfer time.

Then, at step S90, the robot controller 200 has its operation controlling section 209 acquire the information that indicates the location and posture of each workpiece W and that has been acquired at step S30, information indicating the holding operation form of each workpiece W determined at step S40, and information indicating the transfer order determined at step S80. Then, based on these acquired pieces of information, the robot controller 200 has its operation controlling section 209 control operations of the arm 102 and the gripper 103 of the robot main body 100 so as to transfer each workpiece W in accordance with the transfer order determined at step S80 while gripping the workpiece W in the holding operation form determined at step S40. Then, similar processings are executed again back at step S10.

As has been described hereinbefore, in this embodiment, the robot main body 100 includes the arm 102 and the gripper 103, and the arm 102 and the gripper 103 transfer, in order, a plurality of workpieces W to be processed on a four-workpieces W basis. The plurality of workpieces W are arranged at positions of a variety of different distances from the robot main body 100. When such workpieces W are transferred in order, the distances vary from the locations of the workpieces W to their transfer destination, namely, the workpiece placement position 30a on the conveyor 30. In this case, if the workpieces W are transferred in random order, or, simply, if the workpieces W are transferred in distance ascending order relative to the robot main body 100, a possibility occurs of continuously transferring those workpieces W with increasing transfer time or continuously transferring those workpieces W with decreasing transfer time. As a result, the transfer work makes uneven progress in time, which can make it difficult to perform smooth transfer work.

In view of this, in this embodiment, the distance determining section 205 calculates, for each of the plurality of workpieces W, the entire transfer distance from the location of each workpiece W to the workpiece placement position 30a. Then, based on the calculation result, the order determining section 208 determines the transfer order of the workpieces W so that every set of four workpieces W has uniform transfer time. Then, the arm 102 and the gripper 103 perform transfer work in the order determined by the control performed by the operation controlling section 209. Thus, the transfer time when viewed on a four-workpieces W basis is approximately uniform among the sets. This ensures smooth transfer work as opposed to the above-described situation in which the transfer work makes uneven progress in time.

It is particularly noted that in this embodiment, based on the entire transfer distance of each of the workpieces W calculated by the distance determining section 205, the transfer time calculating section 207 calculates the transfer time of each workpiece W. Then, based on the transfer time of each workpiece W calculated by the transfer time calculating section 207, the order determining section 208 determines the transfer order of the workpieces W so that every set of four workpieces W has uniform transfer time. Calculating the transfer time of each of the workpieces W and determining their order using the calculated transfer time in the above-described manner ensure reliable, smooth transfer work with improved accuracy.

It is particularly noted that in this embodiment, the distance determining section 205 collectively calculates the entire transfer distances of the workpieces W. Collectively calculating the entire transfer distances of the workpieces W in this manner shortens the time necessary for the distance calculation processing, which in turn shortens the entire transfer time.

It is particularly noted that this embodiment provides the following advantageous effects. When the workpiece W is disposed in a posture that is difficult to grip by the gripper 103, it is at times necessary to reduce the transfer speed or have the gripper 103 temporarily change the posture of the workpiece W into some another posture, after which the workpiece can be gripped. This necessitates longer transfer time than the transfer time of the workpiece W in normal posture. In view of this, in this embodiment, the image processing section 403 detects the posture of each of the workpieces W. Then, the transfer time calculating section 207 calculates the transfer time of each of the workpieces W not only in accordance with the entire transfer distance but also in accordance with the posture of each workpiece W. This provides a correction to the elongated transfer time caused by posture, ensuring smooth transfer work with improved accuracy.

It is particularly noted that in this embodiment, the order determining section 208 determines the transfer order of the workpieces W so that uniform transfer time is ensured for every set of four workpieces W, which is collectively processed in the predetermined post-processing step after the workpieces W have been transferred. This ensures efficient processing performed after the transfer work of the workpieces W has been done, with no or minimal congestion and time loss associated with forwarding the workpieces W to the post-processing step.

Modifications will be described below.

Figure 10:
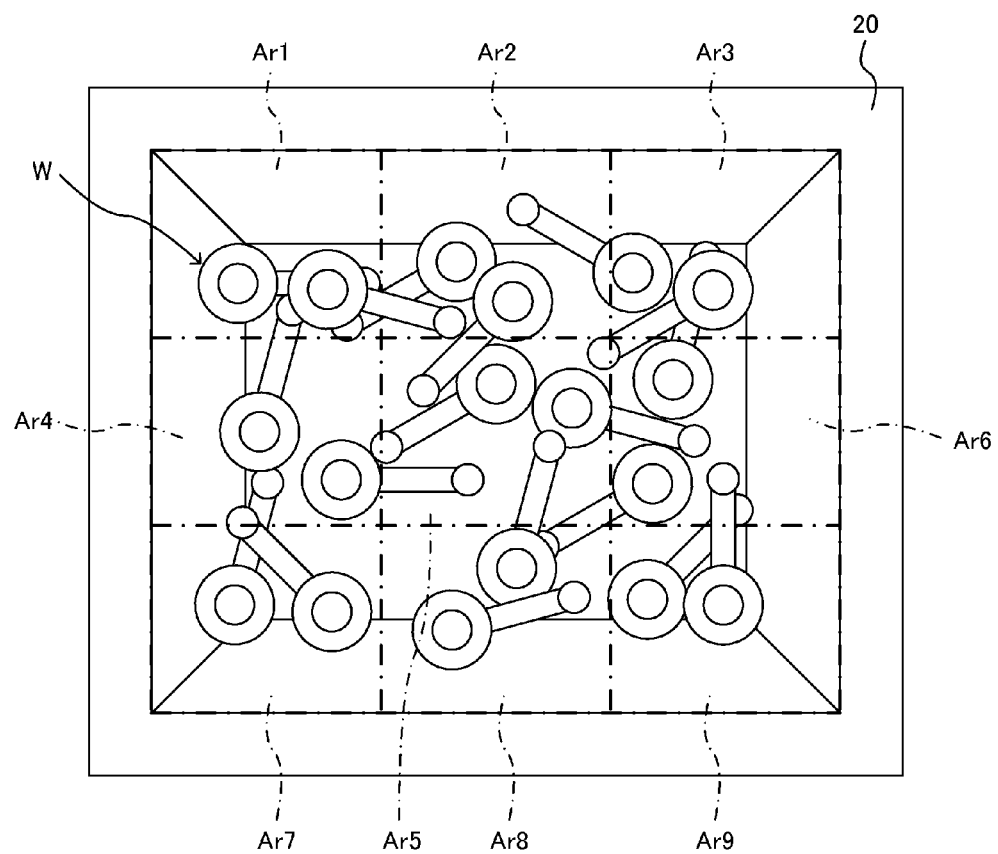
FIG. 10 is a top view of the stocker, illustrating an inside of the stocker, according to a modification in which the distance between a predetermined position in a sub-region and a workpiece placement position is assumed an entire transfer distance.

(1) Case Where the Distance From a Predetermined Position in a Sub-Region to the Workpiece Placement Position is Assumed the Entire Transfer Distance As shown in FIG. 10, in a robot system 1 according to this modification, a plurality of workpieces W are in stock in a random manner in the inner-stocker 20 entire region, and the inner-stocker 20 entire region is divided into a plurality of sub-regions. There is no particular limitation to the number of the sub-regions. In this modification, the number of the sub-regions is illustrated as nine. Specifically, in this modification, the inner-stocker 20 entire region is divided into nine sub-regions Ar1, Ar2, Ar3, Ar4, Ar5, Ar6, Ar7, Ar8, and Ar9.

The laser scanner 301 of the sensor unit 300 according to this modification uses a mirror to reflect laser slit light generated by the laser light source, and uses a motor to rotate the mirror, thereby radiating from above laser slit light to the sub-regions Ar1 to Ar9 as a unit of radiation. In this manner, the laser scanner 301 scans the workpieces W located in the sub-regions Ar1 to Ar9 as a unit of scanning When the laser slit light is generated by the laser light source and reflected by the mirror as described above, the reflected objects located in one sub-region reflect the laser slit light, which results in reflection light of the laser slit light. The camera 302 of the sensor unit 300 according to this modification uses an image pick-up device to pick up an image of the reflection light of the laser slit light. That is, the camera 302 has its image pick-up device pick up an image (grayscale image) from above the one sub-region, and an image of the reflection light of the laser slit light reflected by the reflected objects located in the sub-region.

The sensor controller 310 of the sensor unit 300 according to this modification detects the distance to the reflected objects located in the one sub-region. Then, the sensor controller 310 outputs to the image processing apparatus 400 a detection signal as a detection result of the sensor unit 300. The detection signal includes the image picked up from above the one sub-region, and distance information that is indicated on this image and that corresponds to the detected distance to the reflected objects located in the one sub-region.

Further, based on the detection signal from the sensor controller 310 and other information, the image processing apparatus 400 according to this modification individually recognizes (measures three-dimensionally) the workpieces W located in the sub-region that has been scanned by the sensor unit 300.

Figure 11:
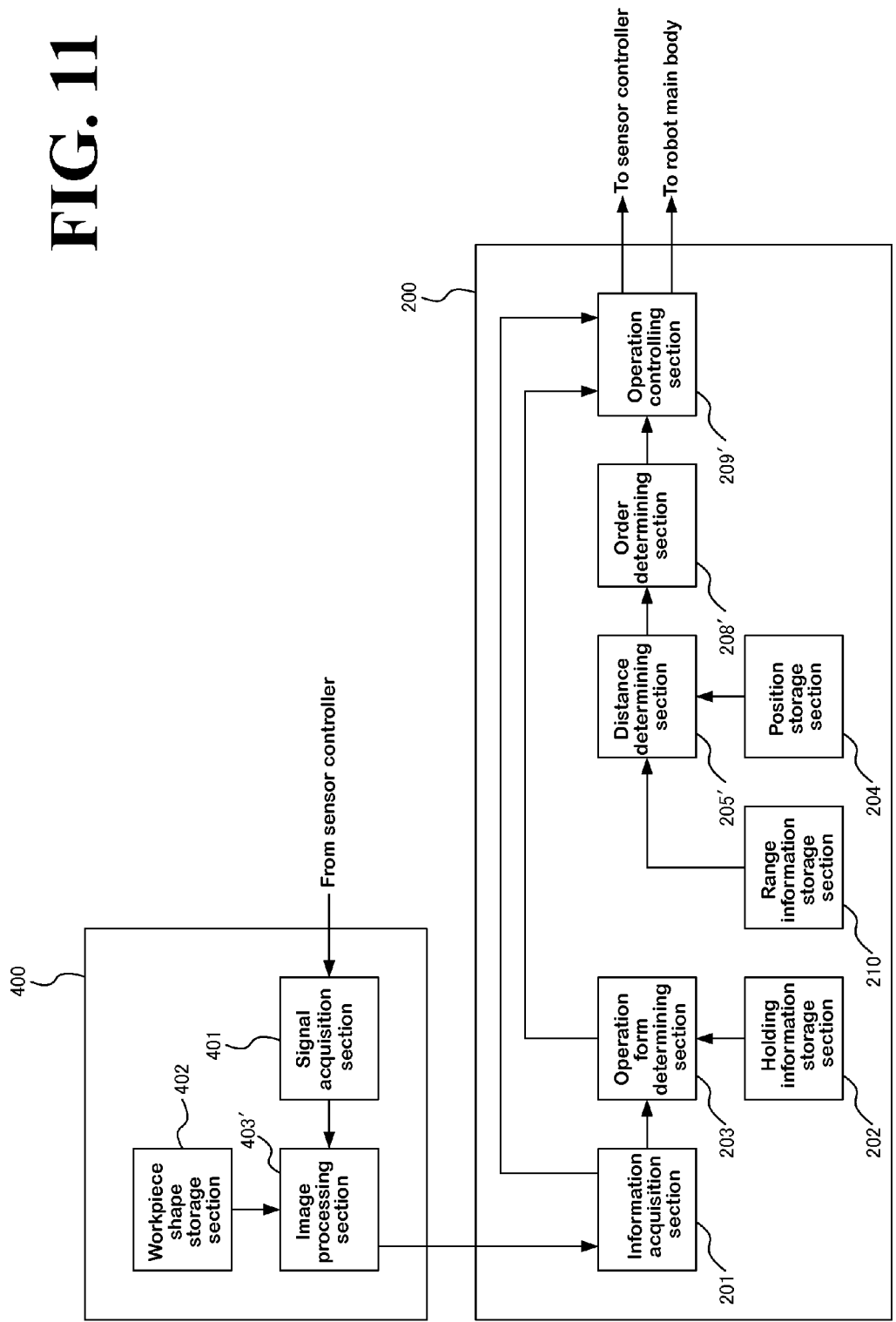
FIG. 11 is a function block diagram illustrating a functional configuration of the image processing apparatus and the robot controller.

Next, by referring to FIG. 11, a functional configuration of the image processing apparatus 400 and the robot controller 200 according to this modification will be described. FIG. 11 corresponds to FIG. 4. In FIG. 11, the elements equivalent to those in FIG. 4 are designated the same reference numerals as in FIG. 4, and description of these elements will be omitted.

As shown in FIG. 11, a robot controller 200 according to this modification includes the information acquisition section 201, the holding information storage section 202, the operation form determining section 203, the position storage section 204, a range information storage section 210, a distance determining section 205', an order determining section 208', and an operation controlling section 209'.

The range information storage section 210 stores range information (position information) of the sub-regions Ar1 to Ar9 of the inner-stocker 20 entire region.

The distance determining section 205' acquires the range information of the sub-regions Ar1 to Ar9 stored in the range information storage section 210, and the position information that indicates the workpiece placement position 30a on the conveyor 30 and that is stored in the position storage section 204. Then, based on these acquired pieces of information, the distance determining section 205' assumes the entire transfer distance of each workpiece W located in each of the sub-regions Ar1 to Ar9 as the distance from a predetermined position (for example, center position) of each of the sub-regions Ar1 to Ar9 to the workpiece placement position 30a (the distance being hereinafter referred to as assumed entire transfer distance), and calculates the assumed entire transfer distance.

Based on information indicating the assumed entire transfer distance of each of the sub-regions Ar1 to Ar9 calculated by the distance determining section 205', the order determining section 208' determines the order of the sub-regions Ar1 to Ar9 from which to transfer the workpieces W. More specifically, the order determining section 208' determines the order of the sub-regions Ar1 to Ar9 from which to transfer the workpieces W so that every set of (four) workpieces W, which is collectively processed in the above-described post-processing step, has approximately uniform transfer time. As used herein, the phrase "determining the order of the sub-regions Ar1 to Ar9 from which to transfer the workpieces W" can be rephrased as "determining the transfer order of the workpieces W".

The operation controlling section 209' acquires information indicating the order that is associated with the plurality of sub-regions Ar1 to Ar9 from which to transfer the workpieces W and that has been determined by the order determining section 208'. Then, based on the acquired information, the operation controlling section 209' generates an operation signal for the sensor controller 310 so as to cause the sensor unit 300 to scan the plurality of sub-regions Ar1 to Ar9 in accordance with the order determined by the order determining section 208'. Then, the operation controlling section 209' outputs the generated operation signal to the sensor controller 310, thereby controlling an operation of the sensor unit 300. The operation controlling section 209' also acquires information indicating the location and posture of each workpiece W acquired by the information acquisition section 201, and information indicating the holding operation form of each workpiece W determined by the operation form determining section 203. Then, the operation controlling section 209' generates an operation signal for the servo motors of the arm 102 and the actuator of the gripper 103 so as to transfer the workpieces W located in the sub-regions scanned by the sensor unit 300 in accordance with the order determined by the order determining section 208' and in the holding operation forms determined by the operation form determining section 203. Then, the operation controlling section 209' outputs the generated operation signal to the servo motors of the arm 102 and to the actuator of the gripper 103, thereby controlling the operations of the arm 102 and the gripper 103 of the robot main body 100. As used herein, the phrase "controlling the operations of the arm 102 and the gripper 103 so as to transfer the workpieces W located in the scanned sub-regions in accordance with the order determined by the order determining section 208'''" can be rephrased as "controlling the operations of the arm 102 and the gripper 103 so as to transfer the workpieces W in accordance with the order determined by the order determining section 208'''".

An image processing apparatus 400 according to this modification includes the signal acquisition section 401, the workpiece shape storage section 402, and an image processing section 403'.

The image processing section 403' performs the above-described image processing based on the three-dimensional shape information of the workpieces W stored in the workpiece shape storage section 402 and based on the detection signal acquired by the signal acquisition section 401. In this manner, the image processing section 403' individually recognizes the workpieces W located in the sub-regions scanned by the sensor unit 300. At the same time, the image processing section 403' detects the location and posture of each of the recognized workpieces W. Then, the image processing section 403' outputs information indicating the location and posture of each detected workpiece W to the robot controller 200.

Next, by referring to FIG. 12, description will be made with regard to an exemplary procedure of control executed by the image processing apparatus 400 and the robot controller 200 according to this modification. Among the processings in the flow shown in FIG. 12, the processings at steps S140 and S150 are executed at the image processing apparatus 400, while the processings at steps S110 to S130 and steps S160 to S190 are executed at the robot controller 200.

Figure 12:
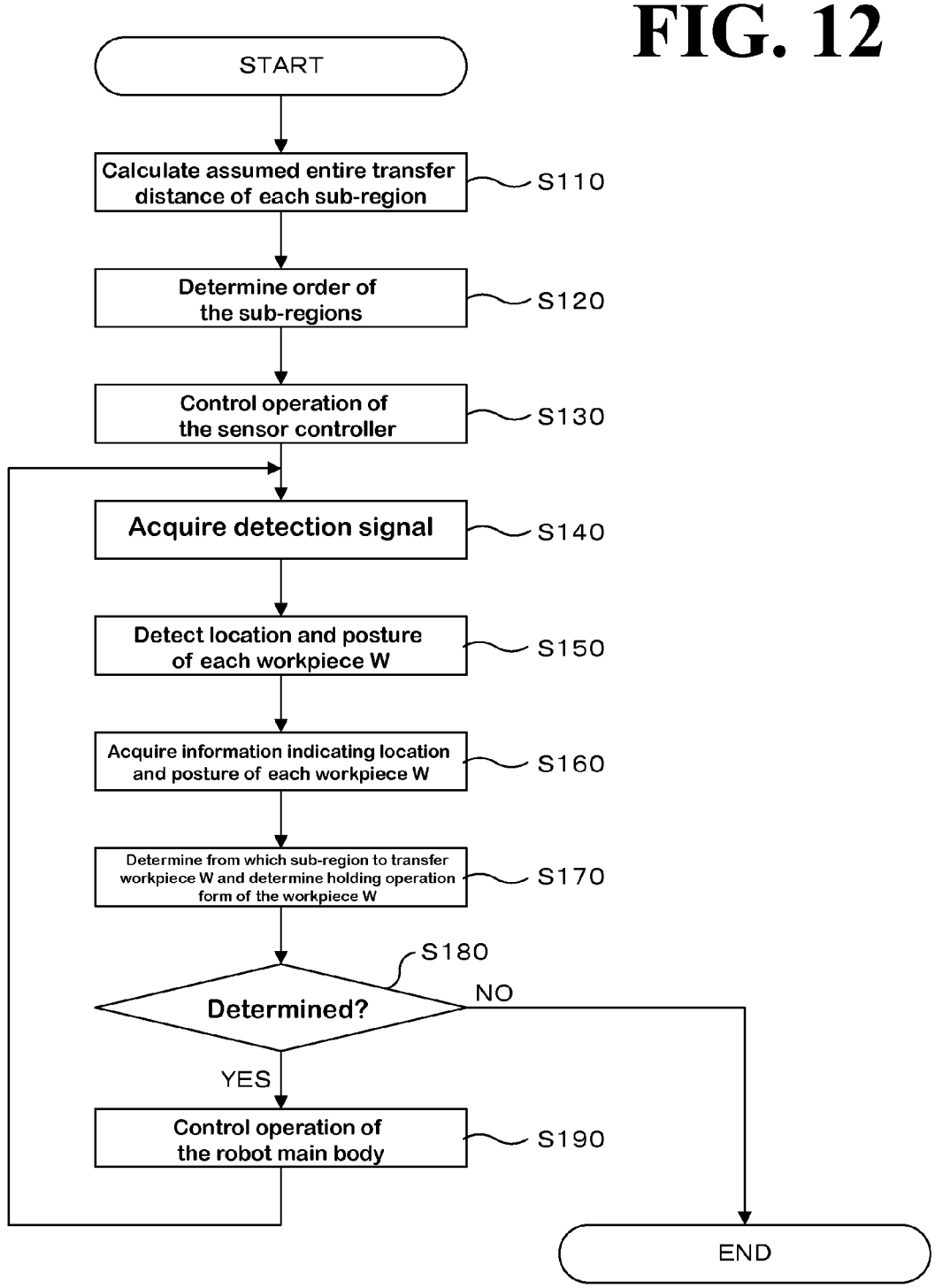
FIG. 12 is a flowchart of an exemplary procedure of control executed by the image processing apparatus and the robot controller.

As shown in FIG. 12, at step S110, the robot controller 200 has its distance determining section 205' acquire the range information of the sub-regions Ar1 to Ar9 stored in the range information storage section 210, and the position information that indicates the workpiece placement position 30a on the conveyor 30 and that is stored in the position storage section 204. Then, based on these acquired pieces of information, the robot controller 200 has its distance determining section 205' assume the assumed entire transfer distance of each of the sub-regions Ar1 to Ar9 as the entire transfer distance of each workpiece W located in each of the sub-regions Ar1 to Ar9, and calculate the assumed entire transfer distance.

Then, at step S120, the robot controller 200 has its order determining section 208' acquire information indicating the assumed entire transfer distance of each of the sub-regions Ar1 to Ar9 calculated at step S110 under the assumption of the entire transfer distance of each workpiece W located in each of the sub-regions Ar1 to Ar9. Then, based on the acquired information, the robot controller 200 has its order determining section 208' determine the order of the sub-regions Ar1 to Ar9 from which to transfer the workpieces W so that every set of (four) workpieces W, which is collectively processed in the post-processing step, has approximately uniform transfer time.

Then, at step S130, the robot controller 200 has its operation controlling section 209' acquire information that indicates the order of the sub-regions from which to transfer the workpieces W and that has been determined at step S120. Then, based on the acquired information, the robot controller 200 has its operation controlling section 209' output an operation signal to the sensor controller 310 so as to cause the sensor unit 300 to scan the sub-regions Ar1 to Ar9 in accordance with the order determined at step S120.

In this manner, the sensor controller 310 outputs a detection signal to the image processing apparatus 400, and at step S140, the image processing apparatus 400 has its signal acquisition section 401 acquire the detection signal.

Then, at step S150, the image processing apparatus 400 has its image processing section 403' individually recognize the workpieces W located in the sub-regions scanned by the sensor unit 300 based on the three-dimensional shape information of the workpieces W stored in the workpiece shape storage section 402 and based on the detection signal acquired at step S140, while at the same time detecting the locations and postures of the recognized workpieces W. Then, the image processing apparatus 400 has its image processing section 403 output to the robot controller 200 information indicating the detected location and posture of each workpiece W.

Then, at step S160, the robot controller 200 has its information acquisition section 201 acquire the information indicating the location and posture of each workpiece W output from the image processing section 403 at step S150.

Then, at step S170, the robot controller 200 has its operation form determining section 203 acquire the information that indicates the location and posture of each workpiece W and that has been acquired at step S160, and acquire information stored in the holding information storage section 202, namely, information indicating the holding operation forms of the plurality of kinds of workpieces W and the execution conditions for the holding operation forms. Then, based on these acquired pieces of information, the robot controller 200 has its operation form determining section 203 determine a particular workpiece W, among the workpieces recognized at step S150, as a workpiece W to be transferred when the particular workpiece W satisfies any of the execution conditions for the holding operation forms (for example, easiest workpiece W to grip), and determine the holding operation form of the workpiece W. When no workpiece W satisfies any of the execution conditions for the holding operation forms, no determination is made as to the workpiece W to be transferred.

Then, at step S180, the robot controller 200 determines whether the workpiece W to be transferred has been determined at step S170. When no workpiece W to be transferred has been determined at step S170, that is, when no workpiece W satisfies any of the execution conditions for the holding operation forms, the determination at step S180 is not in the affirmative, and the processings illustrated on this flow end. It should be noted, however, that when there are still some workpieces W left, the robot main body 100 may perform a derangement operation with respect to these workpieces W as necessary, after which similar processings may be executed again back at step S140. When the workpiece W to be transferred has been determined at step S170, the determination at step S180 is in the affirmative, and the flow proceeds to step S190.

At step S190, the robot controller 200 has its operation controlling section 209' acquire the workpiece W that is to be transferred and has been determined at step S180 and information indicating the holding operation form of the workpiece W. Then, based on these acquired pieces of information, the robot controller 200 has its operation controlling section 209' control operations of the arm 102 and the gripper 103 of the robot main body 100 so as to transfer the workpiece W determined to be transferred at step S180 while gripping the workpiece W in the holding operation form determined simultaneously with the workpiece W. Then, similar processings are executed again back at step S140. The workpieces W transferred at step S190 are the workpieces W located in the sub-regions scanned in accordance with the order determined at step S120. Thus, at step S190, the operation controlling section 209' can be viewed as controlling the operations of the arm 102 and the gripper 103 so as to transfer the workpieces W located in the sub-regions Ar1 to Ar9 in accordance with the order determined at step S120.

In this modification described hereinbefore, the distance determining section 205' divides the region in which all the workpieces W are disposed into nine sub-regions Ar1 to Ar9, assumes the entire transfer distance of each workpiece W located in each of the sub-regions Ar1 to Ar9 as the distance from a predetermined position in each of the sub-regions Ar1 to Ar9 to the workpiece placement position 30a, and calculates this distance. This ensures a simpler method of calculating the entire transfer distance of each workpiece W.

(2) Case of a Constant Height From the Installation Position of the Robot to the Disposed Surfaces of All the Workpieces In the above-described embodiment, the sensor unit 300 is provided to detect the locations of each of the workpieces W in the horizontal direction and the vertical direction, and based on a detection result of the sensor unit 300, the distance determining section 205 of the robot controller 200 calculates the entire transfer distance of each of the workpieces W from the location of each workpiece W to the workpiece placement position 30a on the conveyor 30. This example, however, should not be construed as limiting the present invention.

Other examples include the case of a constant vertical height from the installation position of the robot main body 100 to the disposed surfaces of all the workpieces W. In this case, a sensor is provided to detect the location of each workpiece W in the horizontal direction. Then, based on a detection result of the sensor, the distance determining section of the robot controller 200 calculates the horizontal distance from the location of each workpiece W to the workpiece placement position 30a. Then, the distance determining section may determine the entire transfer distance by adding the above-described vertical height to the calculated horizontal distance from the location of each workpiece W to the workpiece placement position 30a. The vertical height corresponds to the vertical transfer distance from the location of each workpiece W to the workpiece placement position 30a, and is fixed in advance.

With this modification, use of the horizontal transfer distance of each workpiece W based on the detection result of the sensor and use of the vertical height that corresponds to the vertical transfer distance ensure a simpler method of quickly determining the entire transfer distance.

(3) Other Notes

In the above-described embodiment, the image processing section 403 detects both the location and posture of each workpiece W, and outputs information indicating both the location and posture of each workpiece W. This example, however, should not be construed as limiting the present invention. For example, the image processing section may detect the location of each workpiece W alone and output information indicating the location of the workpiece W alone. In this case, the transfer time calculating section 207 calculates the transfer time of each workpiece W based on the entire transfer distance of the workpiece W determined based on the location of the workpiece W.

Also in the above-described embodiment, the order determining section 208 determines the transfer order of the workpieces W based on the transfer time of each of the workpieces W calculated by the transfer time calculating section 207. This example, however, should not be construed as limiting the present invention. For example, the transfer time calculating section 207 may be omitted, and the order determining section may determine the transfer order of the workpieces W based on the calculation result of the distance determining section 205.

Also in the above-described embodiment and modification, the sensor unit 300 includes the laser scanner 301 and the camera 302 to detect the location of each workpiece W and other parameters. This example, however, should not be construed as limiting the present invention. It is also possible to use a sensor of a format different from the above-described format to detect the location of each workpiece W and other parameters.

Also in the above-described embodiment and modification, the image processing apparatus 400 detects the location of each workpiece W and other parameters. This example, however, should not be construed as limiting the present invention. For example, it is also possible to provide the robot controller or the sensor controller with an image processing function so as to make the robot controller or the sensor controller detect the location of each workpiece W and other parameters.

Also in the above-described embodiment and modification, the robot apparatus 10 is applied to transfer of a plurality of workpieces W in order. This example, however, should not be construed as limiting the present invention. For example, the robot apparatus 10 may be applied to collection processing involving transfer of a plurality of workpieces W in order.

It is also noted that the arrows shown in FIGS. 4 and 11 indicate exemplary signal flows and should not be construed as limiting the signal flow directions.

It is also noted that the flowcharts shown in FIGS. 9 and 12 should not be construed as limiting the embodiment to the illustrated procedures. The procedures are open to addition and deletion, and the orders are open to change without departing from the technical scope of the present invention.

Otherwise, the above-described embodiment and modification may be combined in any manner deemed suitable.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A robot apparatus comprising:
    a robot main body configured to transfer a plurality of to-be-processed objects in order so as to subject every predetermined number of to-be-processed objects among the plurality of to-be-processed objects to processing, the robot main body comprising:
        a robot arm; and
        a robot hand configured to hold a to-be-processed object among the plurality of to-be-processed objects by at least one of gripping and suction;
    a distance determining section configured to determine an entire transfer distance of each of the plurality of to-be-processed objects, the entire transfer distance being from a location of each of the plurality of to-be-processed objects to a transfer destination of each of the plurality of to-be-processed objects;
    an order determining section configured to determine a transfer order of the plurality of to-be-processed objects based on a determination result of the distance determining section so that every set including a predetermined number of the to-be-processed objects has approximately uniform total transfer time, the predetermined number being equal to or larger than two; and an operation controlling section configured to control an operation of the robot arm and an operation of the robot hand so as to transfer the plurality of to-be-processed objects in accordance with the transfer order determined by the order determining section.

2. The robot apparatus according to claim 1, wherein the order determining section is configured to determine the transfer order of the plurality of to-be-processed objects so that every set including the predetermined number of the to-be-processed objects has approximately uniform total transfer time when the predetermined number of to-be-processed objects are collectively subjected to a predetermined post-processing step after the plurality of to-be-processed objects have been transferred.

3. A robot apparatus comprising:
a robot main body configured to transfer a plurality of to-be-processed objects in order so as to subject every predetermined number of to-be-processed objects among the plurality of to-be-processed objects to processing, the robot main body comprising:
a robot arm; and
a robot hand configured to hold a to-be-processed object among the plurality of to-be-processed objects by at least one of gripping and suction;
a distance determining section configured to determine an entire transfer distance of each of the plurality of to-be-processed objects, the entire transfer distance being from a location of each of the plurality of to-be-processed objects to a transfer destination of each of the plurality of to-be-processed objects;
an order determining section configured to determine a transfer order of the plurality of to-be-processed objects based on a determination result of the distance determining section so that every predetermined number of the to-be-processed objects has approximately uniform transfer time;
an operation controlling section configured to control an operation of the robot arm and an operation of the robot hand so as to transfer the plurality of to-be-processed objects in accordance with the transfer order determined by the order determining section; and
a transfer time calculating section configured to calculate transfer time of each of the plurality of to-be-processed objects based on the entire transfer distance of each of the plurality of to-be-processed objects determined by the distance determining section,
wherein based on the transfer time of each of the plurality of to-be-processed objects calculated by the transfer time calculating section, the order determining section is configured to determine the transfer order of the plurality of to-be-processed objects so that every predetermined number of the to-be-processed objects has approximately uniform transfer time.

4. The robot apparatus according to claim 3, wherein the distance determining section is configured to collectively determine entire transfer distances of the plurality of to-be-processed objects.

5. The robot apparatus according to claim 4, further comprising a sensor configured to detect a location of each of the plurality of to-be-processed objects in a horizontal direction,
wherein the distance determining section is configured to determine the entire transfer distance using a horizontal transfer distance that is from the location of each of the plurality of to-be-processed objects to the transfer destination of each of the plurality of to-be-processed objects and using a vertical transfer distance that is from the location of each of the plurality of to-be-processed objects to the transfer destination of each of the plurality of to-be-processed objects, the horizontal transfer distance being calculated based on a detection result of the sensor, the vertical transfer distance being fixed in advance.

6. The robot apparatus according to claim 5, further comprising a posture determining section configured to determine a posture of each of the plurality of to-be-processed objects,
wherein the transfer time calculating section is configured to calculate the transfer time of each of the plurality of to-be-processed objects in accordance with the entire transfer distance of each of the plurality of to-be-processed objects determined by the distance determining section and in accordance with the posture of each of the plurality of to-be-processed objects determined by the posture determining section.

7. The robot apparatus according to claim 4, further comprising a sensor configured to detect a location of each of the plurality of to-be-processed objects in a horizontal direction,
wherein the distance determining section is configured to determine the entire transfer distance using a horizontal transfer distance that is from the location of each of the plurality of to-be-processed objects to the transfer destination of each of the plurality of to-be-processed objects and using a vertical transfer distance that is from the location of each of the plurality of to-be-processed objects to the transfer destination of each of the plurality of to-be-processed objects, the horizontal transfer distance being calculated based on a detection result of the sensor, the vertical transfer distance being fixed in advance.

8. The robot apparatus according to claim 7, further comprising a posture determining section configured to determine a posture of each of the plurality of to-be-processed objects,
wherein the transfer time calculating section is configured to calculate the transfer time of each of the plurality of to-be-processed objects in accordance with the entire transfer distance of each of the plurality of to-be-processed objects determined by the distance determining section and in accordance with the posture of each of the plurality of to-be-processed objects determined by the posture determining section.

9. The robot apparatus according to claim 4, further comprising a posture determining section configured to determine a posture of each of the plurality of to-be-processed objects,
wherein the transfer time calculating section is configured to calculate the transfer time of each of the plurality of to-be-processed objects in accordance with the entire transfer distance of each of the plurality of to-be-processed objects determined by the distance determining section and in accordance with the posture of each of the plurality of to-be-processed objects determined by the posture determining section.

10. The robot apparatus according to claim 3, further comprising a sensor configured to detect a location of each of the plurality of to-be-processed objects in a horizontal direction,
wherein the distance determining section is configured to determine the entire transfer distance using a horizontal transfer distance that is from the location of each of the plurality of to-be-processed objects to the transfer destination of each of the plurality of to-be-processed objects and using a vertical transfer distance that is from the location of each of the plurality of to-be-processed objects to the transfer destination of each of the plurality of to-be-processed objects, the horizontal transfer distance being calculated based on a detection result of the sensor, the vertical transfer distance being fixed in advance.

11. The robot apparatus according to claim 10, further comprising a posture determining section configured to determine a posture of each of the plurality of to-be-processed objects,
wherein the transfer time calculating section is configured to calculate the transfer time of each of the plurality of to-be-processed objects in accordance with the entire transfer distance of each of the plurality of to-be-processed objects determined by the distance determining section and in accordance with the posture of each of the plurality of to-be-processed objects determined by the posture determining section.

12. The robot apparatus according to claim 3, further comprising a posture determining section configured to determine a posture of each of the plurality of to-be-processed objects,
wherein the transfer time calculating section is configured to calculate the transfer time of each of the plurality of to-be-processed objects in accordance with the entire transfer distance of each of the plurality of to-be-processed objects determined by the distance determining section and in accordance with the posture of each of the plurality of to-be-processed objects determined by the posture determining section.

13. The robot apparatus according to claim 3, wherein the distance determining section is configured to divide a region in which all the plurality of to-be-processed objects are disposed into a plurality of sub-regions, and configured to assume and determine, as the entire transfer distance of the one to-be-processed object, a distance between a predetermined position in one sub-region among the plurality of sub-regions and the transfer destination of one to-be-processed object among the plurality of to-be-processed objects located in the one sub-region.

14. The robot apparatus according to claim 13, further comprising a sensor configured to detect a location of each of the plurality of to-be-processed objects in a horizontal direction,
wherein the distance determining section is configured to determine the entire transfer distance using a horizontal transfer distance that is from the location of each of the plurality of to-be-processed objects to the transfer destination of each of the plurality of to-be-processed objects and using a vertical transfer distance that is from the location of each of the plurality of to-be-processed objects to the transfer destination of each of the plurality of to-be-processed objects, the horizontal transfer distance being calculated based on a detection result of the sensor, the vertical transfer distance being fixed in advance.

15. The robot apparatus according to claim 14, further comprising a posture determining section configured to determine a posture of each of the plurality of to-be-processed objects,
wherein the transfer time calculating section is configured to calculate the transfer time of each of the plurality of to-be-processed objects in accordance with the entire transfer distance of each of the plurality of to-be-processed objects determined by the distance determining section and in accordance with the posture of each of the plurality of to-be-processed objects determined by the posture determining section.

16. The robot apparatus according to claim 13, further comprising a posture determining section configured to determine a posture of each of the plurality of to-be-processed objects,
wherein the transfer time calculating section is configured to calculate the transfer time of each of the plurality of to-be-processed objects in accordance with the entire transfer distance of each of the plurality of to-be-processed objects determined by the distance determining section and in accordance with the posture of each of the plurality of to-be-processed objects determined by the posture determining section.

17. A robot apparatus comprising:
a robot main body configured to transfer a plurality of to-be-processed objects in order so as to subject every predetermined number of to-be-processed objects among the plurality of to-be-processed objects to processing, the robot main body comprising:
a robot arm; and
a robot hand configured to hold a to-be-processed object among the plurality of to-be-processed objects by at least one of gripping and suction;
a distance determining section configured to determine an entire transfer distance of each of the plurality of to-be-processed objects, the entire transfer distance being from a location of each of the plurality of to-be-processed objects to a transfer destination of each of the plurality of to-be-processed objects;
an order determining section configured to determine a transfer order of the plurality of to-be-processed objects based on a determination result of the distance determining section so that every predetermined number of the to-be-processed objects has approximately uniform transfer time; and
an operation controlling section configured to control an operation of the robot arm and an operation of the robot hand so as to transfer the plurality of to-be-processed objects in accordance with the transfer order determined by the order determining section,
wherein the distance determining section is configured to divide a region in which all the plurality of to-be-processed objects are disposed into a plurality of sub-regions, and configured to assume and determine that a distance between a predetermined position in one sub-region among the plurality of sub-regions and the transfer destination of one to-be-processed object among the plurality of to-be-processed objects located in the one sub-region is the entire transfer distance of the one to-be-processed object.

18. The robot apparatus according to claim 17, further comprising a sensor configured to detect a location of each of the plurality of to-be-processed objects in a horizontal direction,
wherein the distance determining section is configured to determine the entire transfer distance using a horizontal transfer distance that is from the location of each of the plurality of to-be-processed objects to the transfer destination of each of the plurality of to-be-processed objects and using a vertical transfer distance that is from the location of each of the plurality of to-be-processed objects to the transfer destination of each of the plurality of to-be-processed objects, the horizontal transfer distance being calculated based on a detection result of the sensor, the vertical transfer distance being fixed in advance.

19. The robot apparatus according to claim 18, further comprising a posture determining section configured to determine a posture of each of the plurality of to-be-processed objects,
    wherein the transfer time calculating section is configured to calculate the transfer time of each of the plurality of to-be-processed objects in accordance with the entire transfer distance of each of the plurality of to-be-processed objects determined by the distance determining section and in accordance with the posture of each of the plurality of to-be-processed objects determined by the posture determining section.

20. The robot apparatus according to claim 17, further comprising a posture determining section configured to determine a posture of each of the plurality of to-be-processed objects,
    wherein the transfer time calculating section is configured to calculate the transfer time of each of the plurality of to-be-processed objects in accordance with the entire transfer distance of each of the plurality of to-be-processed objects determined by the distance determining section and in accordance with the posture of each of the plurality of to-be-processed objects determined by the posture determining section.

\* \* \* \* \*